(12) United States Patent
Mori et al.

(10) Patent No.: US 9,856,845 B2
(45) Date of Patent: Jan. 2, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Sachio Mori, Mishima (JP); Hisato Hirooka, Gotenba (JP); Chikara Dodate, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 17 days.

(21) Appl. No.: 15/180,573

(22) Filed: Jun. 13, 2016

(65) Prior Publication Data

US 2016/0363106 A1 Dec. 15, 2016

(30) Foreign Application Priority Data

Jun. 15, 2015 (JP) ................. 2015-120390

(51) Int. Cl.
| | |
|---|---|
| *F02M 65/00* | (2006.01) |
| *F02D 41/02* | (2006.01) |
| *F02D 41/22* | (2006.01) |
| *F02D 41/24* | (2006.01) |
| *F02D 41/40* | (2006.01) |

(Continued)

(52) U.S. Cl.
CPC ........ *F02M 65/001* (2013.01); *F02D 41/024* (2013.01); *F02D 41/221* (2013.01); *F02D 41/2467* (2013.01); *F02D 41/402* (2013.01); *F02D 41/064* (2013.01); *F02D 41/3023* (2013.01); *F02D 41/3094* (2013.01); *F02D 2200/0614* (2013.01); *Y02T 10/26* (2013.01); *Y02T 10/44* (2013.01)

(58) Field of Classification Search
CPC ... F02M 65/001; F02D 41/024; F02D 41/221; F02D 41/2467; F02D 41/402
USPC .................................. 123/294, 432
See application file for complete search history.

(56) References Cited

U.S. PATENT DOCUMENTS

| | | | |
|---|---|---|---|
| 8,459,021 B2 | 6/2013 | Yamakawa et al. | |
| 8,977,472 B2 | 3/2015 | Kita | |

(Continued)

FOREIGN PATENT DOCUMENTS

| | | |
|---|---|---|
| JP | H09-184437 A | 7/1997 |
| JP | 2000227041 A | 8/2000 |

(Continued)

*Primary Examiner* — Mahmoud Gimie
(74) *Attorney, Agent, or Firm* — Andrews Kurth Kenyon LLP (57) ABSTRACT

Where performing a main injection, and a sub-injection that injects a minute amount of fuel in a short region of driving time, a check is conducted to determine whether or not the minute amount of fuel is injected accurately. In a specific cycle at a time of cold starting when catalyst warm-up control is performed, the main injection is omitted and a checking injection corresponding to a sub-injection is performed. Injection conditions of an in-cylinder injection valve are made uniform between the checking injection and the sub-injection. A fuel amount that is actually injected from the in-cylinder injection valve in the specific cycle is calculated based on an air-fuel ratio of exhaust gas discharged from an engine and an in-cylinder air amount, and is compared with a fuel amount that theoretically should be injected from the in-cylinder injection valve.

7 Claims, 6 Drawing Sheets

(51) Int. Cl.
  *F02D 41/06* (2006.01)
  *F02D 41/30* (2006.01)

(56) References Cited

U.S. PATENT DOCUMENTS

2009/0259383 A1* 10/2009 Wang .................... F02D 35/023
                                                    701/102
2011/0005496 A1   1/2011 Hiraya et al.
2013/0118163 A1   5/2013 Nishimura et al.

FOREIGN PATENT DOCUMENTS

JP    2009-236107 A   10/2009
JP    2011-149364 A    8/2011

* cited by examiner

CONTROL DEVICE FOR INTERNAL COMBUSTION ENGINE

CROSS-REFERENCE TO RELATED APPLICATION

The present application claims priority to Japanese Patent Application No. 2015-120390 filed on Jun. 15, 2015, which is incorporated herein by reference in its entirety.

BACKGROUND

Technical Field

Embodiments of the present invention relate to a control device for an internal combustion engine.

Background Art

Technology has already been proposed that performs a diagnosis regarding aged deterioration of a port injection valve that injects fuel into an intake port of an internal combustion engine and implements a countermeasure in accordance with the diagnosis result, as disclosed, for example, in JP2011-149364A. According to this conventional technology, specifically, the timing at which a port injection valve actually opens is detected based on an in-cylinder vibration waveform signal during an operation to open the port injection valve. Subsequently, a fuel amount that is actually injected from the port injection valve is estimated based on the detected timing and an energization time period of a driving pulse signal that is supplied to the port injection valve. Next, a rate of change is calculated based on the estimated fuel amount and an initial value of the fuel amount that is previously determined (a fuel injection amount during normal operation of the port injection valve). If the calculated rate of change is equal to or greater than a threshold value, it is diagnosed that the port injection valve is deteriorating with age, and the energization time period of the aforementioned driving pulse signal is corrected.

Further, in JPH9-184437A, technology is disclosed that corrects a driving time of an in-cylinder injection valve that directly injects fuel into a cylinder of an internal combustion engine, based on an in-cylinder pressure during driving of the in-cylinder injection valve. In a case where fuel is injected from the in-cylinder injection valve in a compression stroke, because the in-cylinder pressure changes depending on the position of the piston, the change in the in-cylinder pressure affects the fuel amount that is actually injected from the in-cylinder injection valve. Therefore, according to the conventional technology disclosed in JPH9-184437A, a pressure difference between the pressure of fuel supplied to the in-cylinder injection valve and the in-cylinder pressure at an intermediate timing during a driving time of the in-cylinder injection valve is calculated, and the relevant driving time is extended or shortened based on the calculated pressure difference.

LIST OF RELATED ART

Following is a list of patent literatures which the applicant has noticed as related arts of the present invention.
[Patent Literature 1]
  JP2011-149364A
[Patent Literature 2]
  JPH9-184437A
[Patent Literature 3]
  JP2009-236107A

SUMMARY

The diagnostic technique described in JP2011-149364A can be applied to the in-cylinder injection valve described in JPH9-184437A. However, although according to the diagnostic technique described in JP2011-149364A the port injection valve is driven during an intake stroke in which the in-cylinder pressure is approximately constant, according to JPH9-184437A the in-cylinder injection valve is driven during a compression stroke in which the in-cylinder pressure increases. Consequently, in order to apply the diagnostic technique described in JP2011-149364A to the in-cylinder injection valve described in JPH9-184437A, a signal that is caused by a pressure increase and a signal that is caused by fuel injection must be separated from an in-cylinder vibration waveform signal, and it is thus not possible to prevent the diagnostic processing from becoming complicated. Further, the diagnosis described in JP2011-149364A is performed during idling after completing warm-up of the engine that is a time at which an energization time period with respect to the driving pulse signal (that is, a driving time of the port injection valve) is secured to some extent. Consequently, in a case where a driving time of the in-cylinder injection valve is set to an extremely short time period and a minute amount of fuel is injected, a signal that is caused by the fuel injection will be weak, and the influence of noise that is superimposed on the signal will be unavoidable.

Embodiments of the present invention address the above described problems. That is, an object of an embodiment of the present invention is to provide a novel device that is capable of conducting a check as to whether or not a minute amount of fuel is accurately injected where the minute amount of fuel is injected from an in-cylinder injection valve during a compression stroke.

A first embodiment of the present invention is a control apparatus for an internal combustion engine comprising an in-cylinder injection valve that is controlled so as to inject a minute amount of fuel in a compression stroke as a sub-injection performed after a main injection in a same cycle, and a spark plug that is controlled so as to perform ignition after the sub-injection, wherein the control device is configured to:
  control the in-cylinder injection valve, in a cycle in which the main injection is not executed, so as to perform a checking injection that injects a minute amount of fuel corresponding to the sub-injection; and
  calculate an actual fuel amount that is actually injected in the checking injection based on an in-cylinder air amount in a case of performing the checking injection and an air-fuel ratio of exhaust gas of the internal combustion engine, and also check a fuel amount that is injected from the in-cylinder injection valve in the sub-injection based on the calculated actual fuel amount;
  wherein the control device is also configured to:
  set a valve opening time period of the in-cylinder injection valve in the checking injection so as to become equal to a valve opening time period of the in-cylinder injection valve in the sub-injection; and
  control a valve opening start timing in the checking injection so that an in-cylinder pressure becomes equal to an in-cylinder pressure at a valve opening start timing of the in-cylinder injection valve in the sub-injection.

A second embodiment of the present invention is a control apparatus for an internal combustion engine according to the first embodiment discussed above, wherein the control device is also configured to:

control the in-cylinder injection valve so as to perform, as the checking injection, a first checking injection that is before compression top dead center, and a second checking injection that is in a same cycle as the first checking injection and is after compression top dead center;

retard an ignition timing of the spark plug in a case of performing the checking injection until a timing that is after the second checking injection;

set a valve opening time period of the in-cylinder injection valve in the first checking injection so as to become equal to a valve opening time period of the in-cylinder injection valve in the sub-injection, and set a valve opening time period of the in-cylinder injection valve in the second checking injection so as to become equal to a valve opening time period of the in-cylinder injection valve in the sub-injection; and control a valve opening start timing of the in-cylinder injection valve in the first checking injection so as to become equal to a valve opening start timing of the in-cylinder injection valve in the sub-injection, and controls a valve opening start timing of the in-cylinder injection valve in the second checking injection so as to be at a position that is equal to a piston position at a valve opening start timing in the first checking injection.

A third embodiment of the present invention is a control apparatus for an internal combustion engine according to the first embodiment discussed above, wherein the sub-injection is performed for a purpose of increasing a degree of stratification of an air-fuel mixture at a periphery of the spark plug when the internal combustion engine is cold, wherein the control device is also configured to control the in-cylinder injection valve so as to perform the checking injection when the internal combustion engine is cold.

A fourth embodiment of the present invention is a control apparatus for an internal combustion engine according to the first embodiment discussed above, wherein the internal combustion engine further comprises adjustment means that adjusts an in-cylinder air amount, wherein the control device is also configured to control the adjustment means so as to reduce an in-cylinder air amount in a case of performing the checking injection more than an in-cylinder air amount in a case of performing the main injection and the sub-injection.

A fifth embodiment of the present invention is a control apparatus for an internal combustion engine according to the first embodiment discussed above, wherein the main injection and the sub-injection are performed as a part of catalyst warm-up control that increases a degree of stratification of an air-fuel mixture at a periphery of the spark plug when the internal combustion engine is cold to warm up a catalyst that purifies exhaust gas of the internal combustion engine, wherein the control device is also configured to:

calculate a difference between a fuel amount that theoretically should be injected from the in-cylinder injection valve in the checking injection and the actual fuel amount; and increase, where the difference is equal to or greater than a threshold value, a fuel amount in the main injection in accordance with the difference from a cycle after a cycle in which the checking injection is performed.

A sixth embodiment of the present invention is a control apparatus for an internal combustion engine according to the first embodiment discussed above, wherein the main injection is performed by the in-cylinder injection valve.

A seventh embodiment of the present invention is a control apparatus for an internal combustion engine according to the first embodiment discussed above, wherein the internal combustion engine further comprises a port injection valve, and the main injection is performed by the port injection valve.

According to the first embodiment discussed above, after making injection conditions (valve opening time period and valve opening start timing) for a time of a checking injection and injection conditions for a time of a sub-injection uniform, a fuel amount that is injected from an in-cylinder injection valve during the sub-injection can be checked based on an in-cylinder air amount and the calculated actual fuel amount based on the air-fuel ratio of exhaust gas of the internal combustion engine where a checking injection is performed. Accordingly, in an internal combustion engine in which a minute amount of fuel is injected from an in-cylinder injection valve in a compression stroke, a check as to whether or not the sub-injection is accurately performed can be conducted as a sub-injection that is performed after a main injection in the same cycle.

According to the second embodiment discussed above, since a checking injection can be performed twice in a single cycle, in comparison to where a checking injection is performed only once in a single cycle, the accuracy of a check regarding whether or not a sub-injection is accurately performed can be raised.

According to the third embodiment discussed above, conditions relating to the temperature of the internal combustion engine can be made uniform with respect to a time of a checking injection and a time of a sub-injection. Accordingly, the accuracy of a check as to whether or not sub-injection is being accurately performed can be raised.

According to the fourth embodiment discussed above, with respect to performing a checking injection, it is possible to prevent a loss of in-cylinder combustion stability by not executing a main injection.

According to the fifth embodiment discussed above, where a difference between a fuel amount that theoretically should be injected from an in-cylinder injection valve and the actual fuel amount that is injected during a checking injection is equal to or greater than a threshold value, a fuel amount in accordance with the difference can be added to the fuel amount in the main injection. If the difference is equal to or greater than the threshold value, there is a possibility that a sub-injection is not being accurately performed. If a sub-injection is not being accurately performed, the degree of stratification of the air-fuel mixture at the periphery of the spark plug does not rise, and there is a possibility that it will take time to warm up a catalyst. In this respect, if a fuel amount in accordance with the difference is added to increase the fuel amount for the main injection, the aforementioned state in which the degree of stratification does not rise can be compensated for by the increased amount of fuel, and thus the catalyst can be warmed up at an early stage.

According to the sixth embodiment discussed above, where the main injection is performed by an in-cylinder injection valve, a check can be conducted to determine whether a sub-injection which is performed after the main injection is performed accurately or not.

According to the seventh embodiment, where the main injection is performed by a port injection valve, a check can be conducted to determine whether a sub-injection which is performed after the main injection is performed accurately or not.

DETAILED DESCRIPTION

Hereunder, embodiments of the present invention will be described referring to FIG. 1 to FIG. 8. Note that elements that are common to the respective drawings are denoted by the same reference characters and a duplicate description thereof is omitted. Further, embodiments of the present invention are not limited to the embodiments described hereunder.

First Embodiment

First, a first embodiment of the present invention will be described referring to FIG. 1 to FIG. 6.
[Configuration of First Embodiment]

Figure 1:
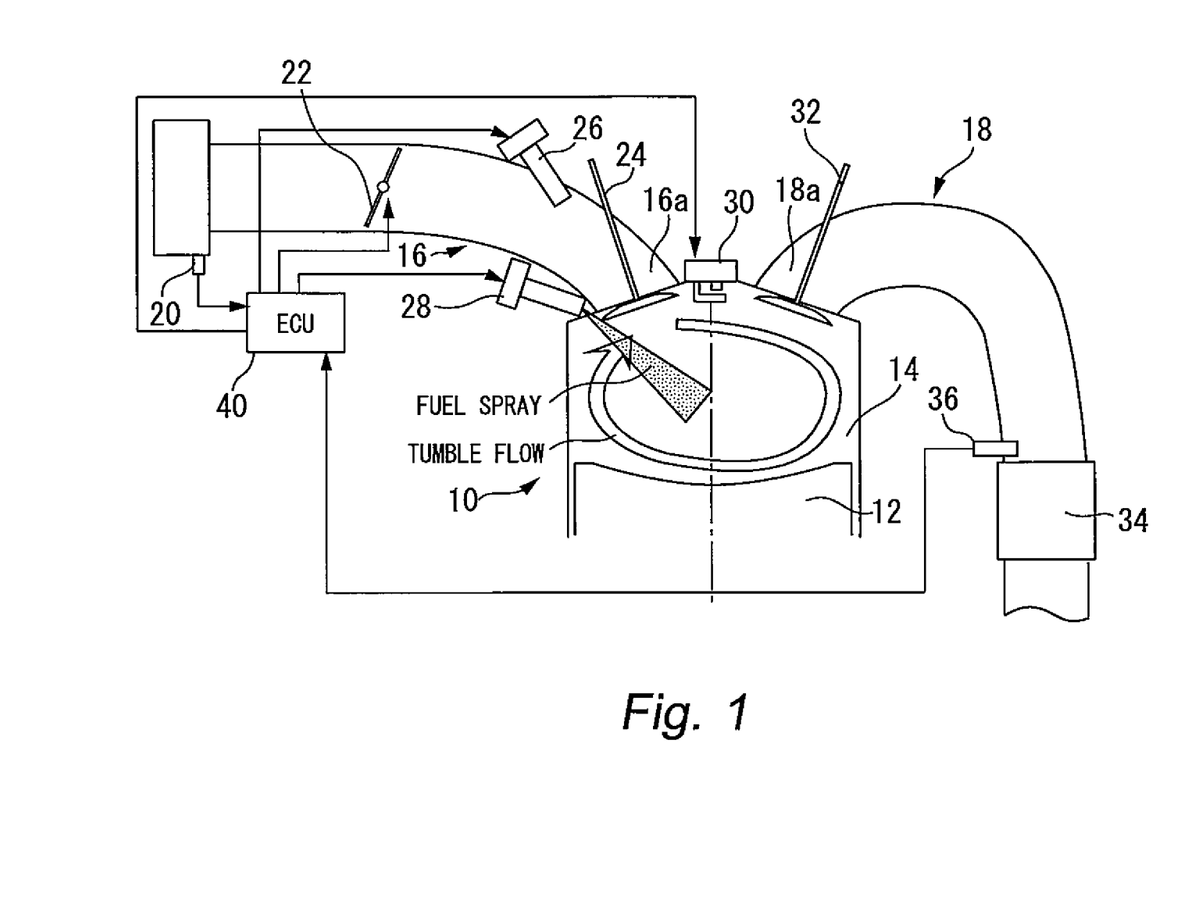
FIG. 1 is a schematic diagram for describing a system configuration of a control device of the first embodiment.

FIG. 1 is a schematic diagram for describing a system configuration of a control device of the first embodiment. As shown in FIG. 1, the system of the first embodiment includes an internal combustion engine (hereunder, also referred to simply as "engine") 10 that is mounted in a vehicle. The engine 10 is a spark-ignition type four-stroke, one-cycle engine that has a plurality of cylinders. A piston 12 is provided in each cylinder of the engine 10. A combustion chamber 14 is formed at the top side of the piston 12 inside the respective cylinders. An intake passage 16 and an exhaust passage 18 communicate with the combustion chamber 14.

An air flow meter 20 for measuring an intake air amount is arranged in the vicinity of an inlet of the intake passage 16. An electronically controlled throttle valve 22 is provided in the intake passage 16 at a position that is downstream relative to the air flow meter 20. The throttle valve 22 can adjust an in-cylinder air amount by means of the opening degree of the throttle valve 22 being adjusted in accordance with an accelerator opening degree.

An intake port 16a that is a site in the intake passage 16 at which the intake passage 16 is connected to the combustion chamber 14 is formed so as to generate a vertically rotating vortex, that is, a tumble flow, inside the combustion chamber 14 by the flow of intake air. Note that, generation of a tumble flow is not limited to generation of a tumble flow that is caused by selecting the shape of the intake port 16a as described above. That is, for example, a configuration may also be adopted in which a tumble control valve (TCV) that makes the strength (tumble ratio) of a tumble flow variable is provided in the intake passage and a tumble flow is generated by controlling the opening degree of the TCV.

An intake valve 24 that opens and closes the intake port 16a is provided in the intake port 16a. A port injection valve 26 that injects fuel into the intake port 16a, and an in-cylinder injection valve 28 that directly injects fuel into the combustion chamber 14 are provided in each cylinder of the engine 10. A spark plug 30 of an ignition device (not illustrated in the drawings) for igniting an air-fuel mixture is also provided in each cylinder. The spark plug 30 is arranged at a central part of a wall surface of the combustion chamber 14 on the cylinder head side.

An exhaust port 18a of the exhaust passage 18 is provided with an exhaust valve 34 that opens and closes the exhaust port 18a. A catalyst 34 for purifying exhaust gas is also disposed in the exhaust passage 18. Further, an A/F sensor 36 for detecting the air-fuel ratio of exhaust gas is installed in the exhaust passage 18 at a position that is upstream of the catalyst 34.

The system illustrated in FIG. 1 also includes an ECU (electronic control unit) 40. The ECU 40 includes an input/output interface, a memory, and a central processing unit (CPU). The input/output interface is provided in order to take in sensor signals from various sensors installed in the engine 10 or the vehicle, and to also output actuating signals to various actuators for controlling the engine 10. Various control programs and maps and the like for controlling the engine 10 are stored in the memory. The CPU reads out, for example, a control program from the memory and executes the control program, and generates actuating signals for the various actuators based on sensor signals that were taken in.

The sensors from which the ECU 40 takes in signals include, in addition to the aforementioned air flow meter 20 and A/F sensor 36, various sensors such as a crank angle sensor for detecting a crank angle and an engine speed, an in-cylinder pressure sensor for detecting an in-cylinder pressure, a water temperature sensor for detecting a water temperature of the engine 10, and a throttle position sensor for detecting an opening degree of the throttle valve 22. The actuators to which the ECU 40 outputs actuating signals include the aforementioned throttle valve 22, port injection valve 26, in-cylinder injection valve 28 and the above described ignition device.

(Combustion Control Utilizing Tumble Flow)

As described above, by prior selection of the shape of the intake port 16a, the engine 10 is configured so that a tumble flow is generated inside the combustion chamber 14. As illustrated in FIG. 1, the tumble flow is a forward tumble flow that ascends on the intake side and descends on the exhaust side. Note that, in FIG. 1, a state in the vicinity of 50° C.A before compression top dead center (compression TDC) is illustrated.

In the first embodiment, combustion control (hereunder, also referred to as "catalyst warm-up control") that utilizes the tumble flow is performed to warm up the catalyst 34 at an early stage when cold-starting the engine 10. The catalyst warm-up control is realized by an air guidance operation that carries a fuel spray to the periphery of the spark plug 30, and by retardation control of the ignition timing of the spark plug 30.

According to the air guidance operation, injection of a fuel amount that is to be injected during one cycle is shared between the port injection valve 26 and the in-cylinder injection valve 28. In the air guidance operation, specifically, of the fuel amount that is to be injected during one cycle, a required minimum amount of fuel for generating a combustible air-fuel mixture layer having a higher fuel concentration than on the outside thereof at the periphery of the spark plug 30 is allocated to the in-cylinder injection valve 28, and the remaining major part of the fuel is allocated to the port injection valve 26. As a result, in a single cycle, injection from the port injection valve 26 (hereunder, also referred to as "main injection") is performed in the intake stroke, and a homogeneous air-fuel mixture is generated by the fuel spray blending in with the tumble flow. Further, in the compression stroke thereafter (specifically, in the vicinity of 50° C.A before compression TDC), injection from the in-cylinder injection valve 28 (hereunder, also referred to as "sub-injection") that is incidental to the main injection is performed, and a part of the homogeneous air-fuel mixture that is carried to the periphery of the spark plug 30 by the tumble flow is stratified.

Further, the retardation control of the ignition timing of the spark plug 30 is control that retards the ignition timing by a large amount relative to the optimal ignition timing (MBT (minimum spark advance for best torque)). Specifically, in the retardation control, the ignition timing is retarded so as to become a timing that is after compression TDC. By retarding the ignition timing by a large amount in this manner, the exhaust gas temperature can be increased to promote warming up of the catalyst 34. Note that, although firing generally becomes unstable if retardation control of the ignition timing is performed, because the degree of stratification of the air-fuel mixture at the periphery of the spark plug 30 is raised by the air guidance operation, a certain amount of firing stability is ensured.

Figure 2:
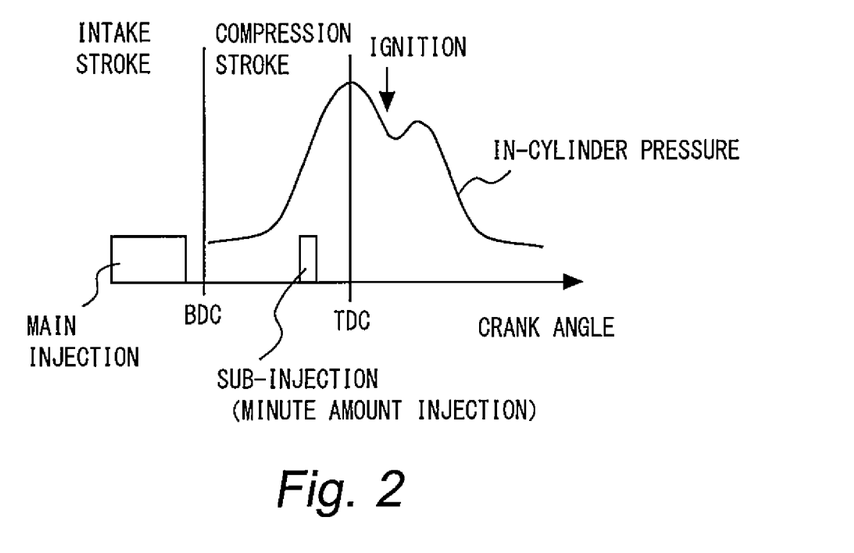
FIG. 2 is a view for describing catalyst warm-up control.

FIG. 2 is a view for describing catalyst warm-up control. As shown in FIG. 2, fuel injection is divided over two operations, with the initial injection corresponding to the main injection, and the second injection corresponding to the sub-injection. Further, quadrangular areas indicating the respective injections correspond to the fuel injection amounts, and it is shown that a far larger amount of fuel is injected by the main injection relative to the sub-injection. Further, the ignition timing of the spark plug 30 is after compression TDC (specifically, 10° to 20° C.A after compression TDC), and the in-cylinder pressure temporarily rises accompanying ignition. According to this kind of catalyst warm-up control, the catalyst 34 can be warmed up without significantly enriching the in-cylinder air-fuel ratio. Accordingly, combustion after cold starting can be stabilized while reducing fuel consumption.

(Problem Accompanying Catalyst Warm-Up Control)

Figure 3:
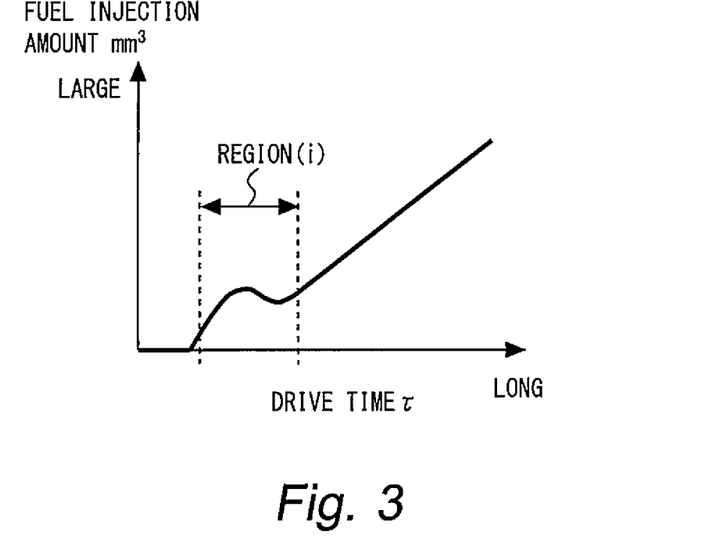
FIG. 3 is a view illustrating the relation between a driving time τ of an injection valve and a fuel injection amount.

FIG. 3 is a view illustrating the relation between a driving time (valve opening time period) $\tau$ of an injection valve (referred to as "port injection valve" or "in-cylinder injection valve"; the same applies hereinafter) and a fuel injection amount. As shown in FIG. 3, the longer the driving time $\tau$ is, the greater the amount of fuel that is injected. However, in an extremely short region (i) of the driving time $\tau$, the driving time and the fuel injection amount do not exhibit a linear relation. This nonlinearity is caused by the structure of the injection valve, and is also observed during normal operation of the injection valve. However, although that is the case, because the aforementioned combustible air-fuel mixture layer can be adequately generated even with a minute amount of fuel in the region (i), in the catalyst warm-up control the driving time $\tau$ of the in-cylinder injection valve 28 at a time of a sub-injection is set to a driving time (fixed time period) with which the driving time $\tau$ of the region (i) and the fuel injection amount exhibit a nonlinear relation. Note that, a region on the left side relative to the region (i) corresponds to a region in which the driving time $\tau$ is too short and no fuel is injected.

In this connection, in some cases deposits are generated from, for example, unburned fuel or soot in the engine 10. When such deposits adhere and accumulate in the vicinity of an injection hole of the injection valve, the deposits affect fuel injection from the injection valve. In this case, the driving time $\tau$ is made comparatively long in the main injection. Consequently, even if deposits adhere and accumulate in the vicinity of an injection hole of the port injection valve 26, it is rare for generation of the aforementioned homogeneous air-fuel mixture to be significantly inhibited thereby. On the other hand, as described referring to FIG. 2, the driving time $\tau$ is made extremely short in the case of the sub-injection. Consequently, if deposits adhere and accumulate in the vicinity of an injection hole of the in-cylinder injection valve 28, most of the minute amount of fuel to be injected in the region (i) shown in FIG. 3 is not injected, and there is a possibility that the aforementioned combustible air-fuel mixture layer will not be generated. Therefore, in the first embodiment, the following method is used to periodically check whether or not the minute amount of fuel to be injected in the region (i) shown in FIG. 3 is accurately injected during a sub-injection.

(Sub-Injection Checking Method)

Figure 4:
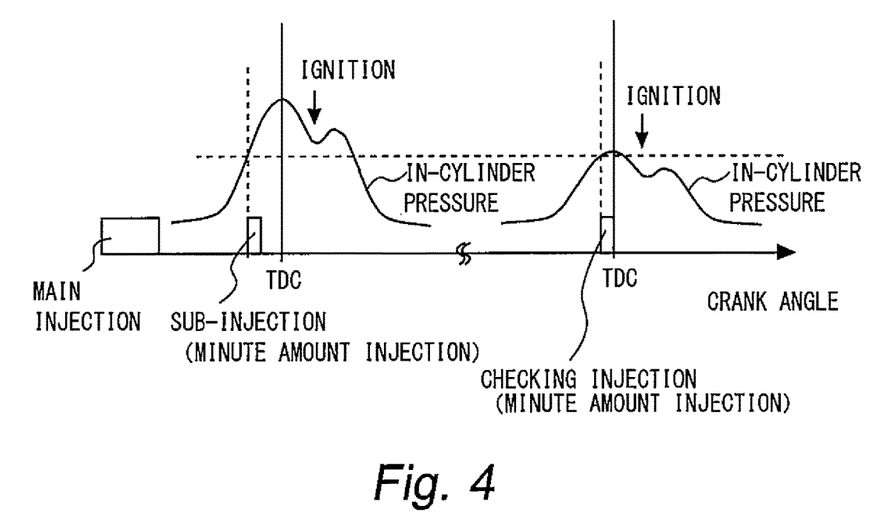
FIG. 4 is a view for describing a method for checking a sub-injection in the first embodiment.

FIG. 4 is a view for describing a method for checking a sub-injection in the first embodiment. As shown in FIG. 4, in the first embodiment, in a specific cycle at a time of cold starting in which the catalyst warm-up control is conducted, the main injection is omitted and a checking injection that corresponds to the sub-injection is performed. Further, a time period of the checking injection (that is, a valve opening time period of the in-cylinder injection valve 28) is set to a time period that is equal to the driving time in the region (i) in FIG. 3. That is, in the checking injection, injection of a minute amount of fuel that is the same as in the sub-injection is performed. Further, in the specific cycle, the opening degree of the throttle valve 22 is decreased to reduce the in-cylinder air amount while performing the above described retardation control of the ignition timing of the spark plug 30. The reason for decreasing the in-cylinder air amount is to prevent a loss in the in-cylinder combustion stability due to omission of the main injection.

Further, as shown in FIG. 4, in the first embodiment, the start timing of the checking injection (that is, the valve opening start timing of the in-cylinder injection valve 28) is controlled so that the in-cylinder pressures are equal at the start timing of the checking injection and the start timing of the sub-injection. By making the injection conditions of the in-cylinder injection valve 28 (that is, the valve opening time period and valve opening start timing of the in-cylinder injection valve 28) uniform between the checking injection and the sub-injection in this way, the checking accuracy with respect to the sub-injection can be raised. Note that, because the in-cylinder air amount is reduced in the specific cycle, the rate of change in the in-cylinder pressure in the compression stroke becomes moderate. Hence, in the compression stroke of the specific cycle, a timing at which the in-cylinder pressure becomes equal to that at the start timing of the sub-injection is set on the retardation side relative to the start timing of the sub-injection.

Figure 5:
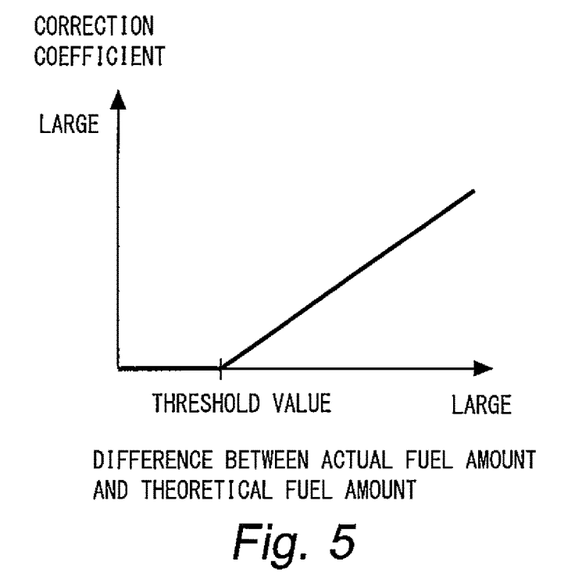
FIG. 5 is a view illustrating the relation between a difference between the actual fuel amount and theoretical fuel amount and a correction coefficient for the fuel amount in the main injection.

The sub-injection check is conducted by calculating a fuel amount (hereunder, also referred to as "actual fuel amount") that is actually injected from the in-cylinder injection valve 28 based on an air-fuel ratio of exhaust gas discharged from the engine 10 in the specific cycle and an in-cylinder air amount in the specific cycle, and comparing the actual fuel amount that is calculated and a fuel amount that theoretically should be injected from the in-cylinder injection valve 28 (hereunder, also referred to as "theoretical fuel amount"). The air-fuel ratio of the exhaust gas is calculated based on a detection value of the A/F sensor 36. The in-cylinder air amount is calculated based on a detection value of the air flow meter 20. Further, the theoretical fuel amount is a fuel amount (fixed value) corresponding to the quadrangular area indicating the sub-injection that is described above referring to FIG. 2.

Where a difference between the actual fuel amount and the theoretical fuel amount (referred to as "value obtained by subtracting the actual fuel amount from the theoretical fuel amount"; the same applies hereinafter) is equal to or greater than a threshold value, it can be determined that injection of the minute amount of fuel in region (i) in FIG. 3 is inhibited by adherence of deposits or the like, and generation of the aforementioned combustible air-fuel mixture layer is not expected. Therefore, where the difference is equal to or greater than the threshold value, the fuel amount in the main injection is increased in cycles after the specific cycle. FIG. 5 is a view illustrating the relation between a difference between the actual fuel amount and theoretical fuel amount and a correction coefficient for the fuel amount in the main injection. As shown in FIG. 5, in a case where the difference between the actual fuel amount and theoretical fuel amount is equal to or greater than the threshold value, the value of the correction coefficient is progressively increased as the difference increases. When the value of the correction coefficient is increased, although the fuel amount in the main injection is increased and the in-cylinder air-fuel ratio is enriched, this increase in the fuel amount compensates for the fact that the state is one in which the aforementioned combustible air-fuel mixture layer cannot be generated, and hence the catalyst 34 can be warmed up at an early stage.

[Specific Processing]

Figure 6:
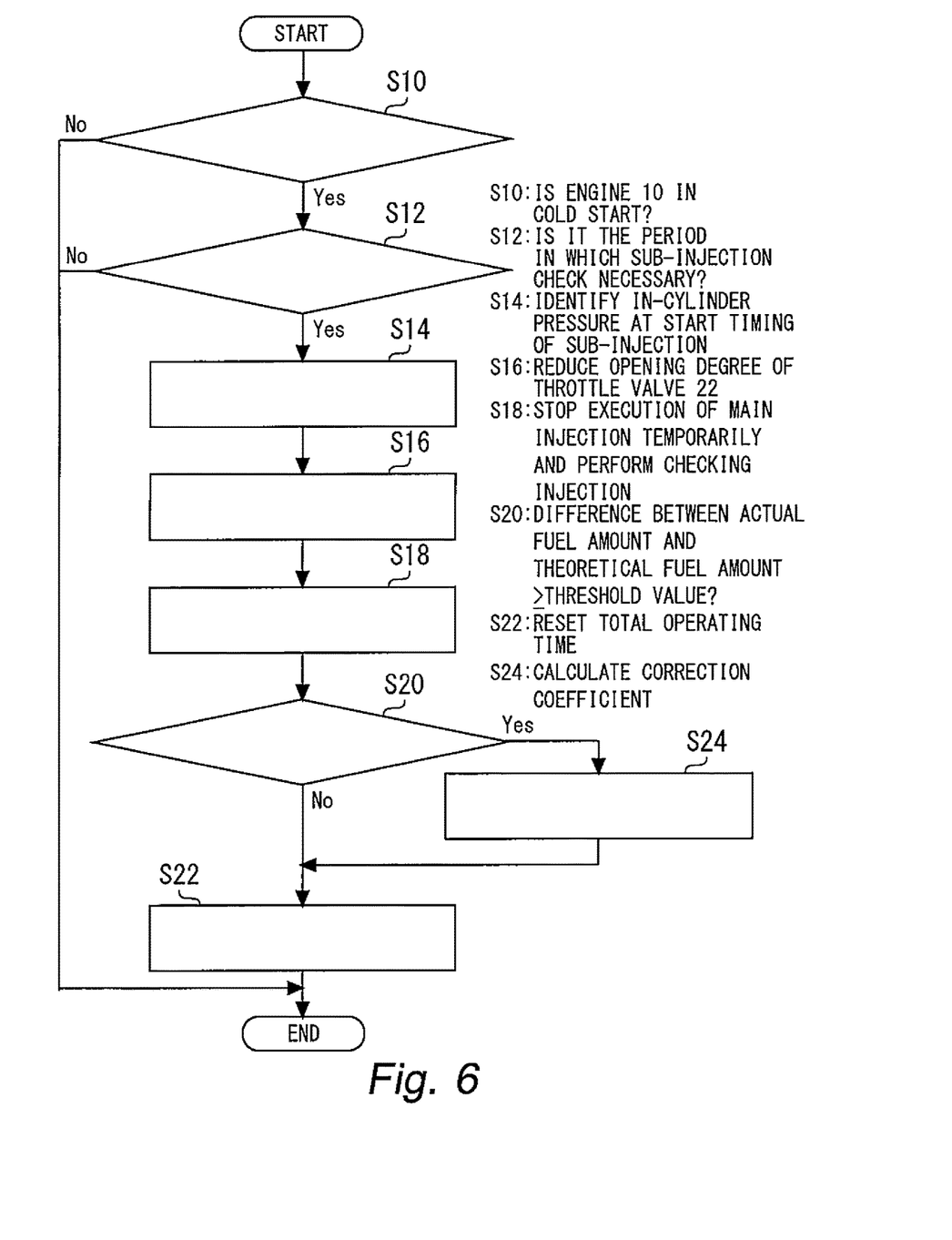
FIG. 6 is a flowchart illustrating a sub-injection check routine that an ECU 40 executes in the first embodiment.

FIG. 6 is a flowchart illustrating a sub-injection check routine that the ECU 40 executes in the first embodiment. Note that, it is assumed that the present routine is repeatedly executed where the driver of the vehicle performs a starting operation.

In the routine shown in FIG. 6, first, the ECU 40 determines whether or not the current state is a time of cold-starting of the engine 10 (step S10). Specifically, the ECU 40 determines whether or not the water temperature of the engine 10 is less than a predetermined temperature. In step S10, the water temperature of the engine 10 is acquired from the above described water temperature sensor. If it is determined that the water temperature of the engine 10 is less than the predetermined temperature, the ECU 40 proceeds to step S12. On the other hand, if it is determined that the water temperature of the engine 10 is equal to or greater than the predetermined temperature, the ECU 40 exits the present routine. Note that, where it is determined that the water temperature of the engine 10 is less than the predetermined temperature, it is assumed that catalyst warm-up control is started by a different control routine to the present routine.

In step S12, the ECU 40 determines whether or not the current period corresponds to a period in which a sub-injection check is necessary. In step S12, whether or not the current period corresponds to a check period is determined based on whether or not a total operating time period of the engine 10 (hereunder, also referred to as "total operating time period") under a predetermined operating condition in which adherence and accumulation of deposits on an injection valve is liable to occur exceeds a predetermined time period. The predetermined operating condition is an operating condition within a predetermined region that is specified based on the speed and load of the engine 10. In the first embodiment, it is assumed that the total operating time period is measured by the ECU 40. If it is determined that the total operating time period exceeds the predetermined time period, the ECU 40 proceeds to step S14. On the other hand, if it is determined that the total operating time period is less than the predetermined time period, the ECU 40 exits the present routine.

Note that the adherence and accumulation of deposits on the injection valve also has a correlation with the driving time of the port injection valve 26, and not just the total operating time period. Therefore, in the determination in step S12, a total of the driving time of the port injection valve 26 can also be used instead of the total operating time period.

In step S14, the ECU 40 identifies the in-cylinder pressure at the start timing of the sub-injection. Since the sub-injection is performed as a result of the catalyst warm-up control being started by the aforementioned different control routine, the ECU 40 acquires the in-cylinder pressure at the start timing of the sub-injection from the aforementioned in-cylinder pressure sensor to thereby identify the in-cylinder pressure.

Following step S14, the ECU 40 decreases the opening degree of the throttle valve 22 (step S16), and temporarily stops execution of the main injection and performs a checking injection (step S18). In step S16, the opening degree of the throttle valve 22 is a predetermined opening degree corresponding to the checking injection. Further, in step S18, the ECU 40 controls the port injection valve 26 so as not to execute the main injection. In addition, the ECU 40 monitors the in-cylinder pressure acquired from the above described in-cylinder pressure sensor, and controls the in-cylinder injection valve 28 so that the checking injection is started at a timing at which the in-cylinder pressure is equal to the in-cylinder pressure identified in step S14.

Note that the processing in step S18 may be performed once or a plurality of times. That is, a checking injection may be performed in only one cycle or may be performed in a plurality of cycles. However, with respect to performing a checking injection in a plurality of cycles, although the checking accuracy with respect to the sub-injection can be improved, because execution of the main injection is temporarily stopped, completion of warming up of the catalyst 34 is delayed compared to where the main injection is performed. Therefore, it is preferable to perform the checking injection in, for example, three to five cycles, and avoid excessively performing the checking injection.

Following step S18, the ECU 40 determines whether or not the difference between the actual fuel amount and the theoretical fuel amount is equal to or greater than the threshold value (step S20). In step S20, the ECU 40 calculates the actual fuel amount. The technique for calculating the actual fuel amount is as described above. Where the processing in step S18 is performed a plurality of times, the ECU 40 calculates an average value of the actual fuel amount that is calculated in accordance with the number of times that processing is performed in step S18. If the difference between the actual fuel amount (or the average value thereof) and the theoretical fuel amount is less than the threshold value, the ECU 40 can determine that the sub-injection is performed accurately. Therefore, the ECU 40 resets the total operating time period (step S22), and exits the present routine.

In contrast, in step S20, if the difference between the actual fuel amount and the theoretical fuel amount is equal to or greater than the threshold value, the ECU 40 can determine that generation of the aforementioned combustible air-fuel mixture layer cannot be expected. Therefore, the ECU 40 calculates a correction coefficient (step S24). In step S24, the correction coefficient is calculated in accordance with the relation described above referring to FIG. 5.

The fuel amount in the main injection from the next cycle onwards is increased by multiplying by the calculated correction coefficient.

Thus, according to the routine illustrated in FIG. 6, since the injection conditions for the checking injection can be made uniform with the injection conditions at a time of the sub-injection, the checking accuracy with respect to the sub-injection can be raised. Further, where a difference between the actual fuel amount and the theoretical fuel amount is equal to or greater than the threshold value, the fuel amount in the main injection can be increased from the next cycle onwards in accordance with the relevant difference. Accordingly, a state in which generation of the aforementioned combustible air-fuel mixture layer cannot be performed can be compensated for by increasing the fuel amount in this manner, and the catalyst 34 can be warmed up at an early stage.

Note that, in the above described first embodiment, the throttle valve 22 corresponds to "adjustment means" of the fourth embodiment discussed above.

In this connection, the above described first embodiment is described based on the premise of a system that includes the port injection valve 26 and the in-cylinder injection valve 28. However, it is also possible to apply the above described first embodiment to a system that includes only the in-cylinder injection valve 28. In such a case, it is sufficient to substitute the main injection described in the above first embodiment with a main injection from the in-cylinder injection valve 28 in the intake stroke or compression stroke. Note that the present modification can also be similarly applied to a second embodiment that is described later.

Further, in the above described first embodiment the in-cylinder air amount is reduced by decreasing the opening degree of the throttle valve 22 in a specific cycle at a time of cold starting. However, the in-cylinder air amount may also be reduced by changing a lift amount or the valve timing of the intake valve 24. Note that the present modification can also be similarly applied to the second embodiment that is described later.

Second Embodiment

Next, a second embodiment of the present invention will be described referring to FIG. 7 to FIG. 8.

Note that the system configuration of the second embodiment and the point that catalyst warm-up control is performed are common with the above described first embodiment, and hence a description thereof is omitted hereunder.
(Sub-Injection Checking Method)

Figure 7:
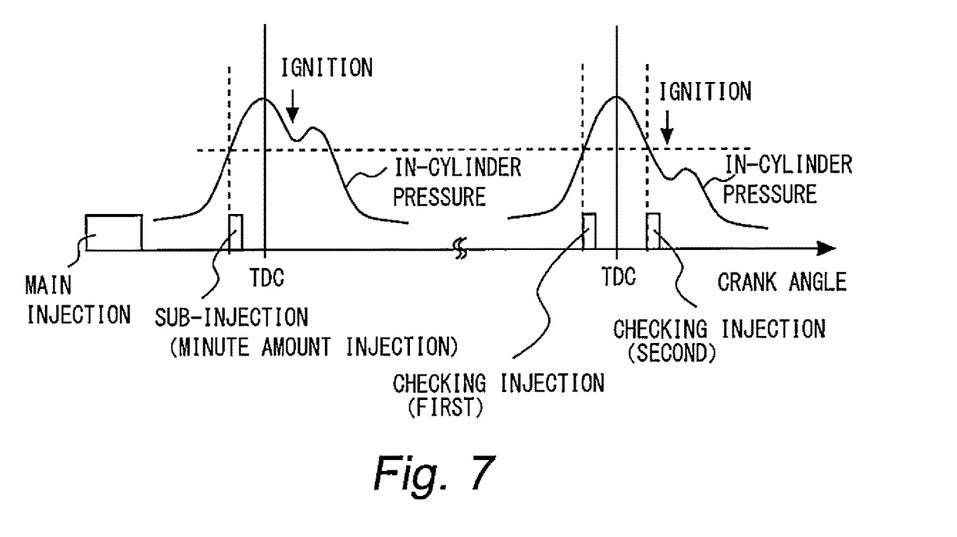
FIG. 7 is a view for describing a method for checking the sub-injection in the second embodiment.

FIG. 7 is a view for describing a method for checking the sub-injection in the second embodiment. As shown in FIG. 7, in the second embodiment, the aforementioned checking injection is performed twice in a specific cycle at a time of cold starting. Further, the respective time periods for these checking injections is set to a time period that is equal to the driving time in the region (i) in FIG. 3. That is, in the second embodiment, the injection of a minute amount of fuel that is described in the above first embodiment is performed twice. However, unlike the foregoing first embodiment, in the second embodiment, the opening degree of the throttle valve 22 is not decreased to reduce the in-cylinder air amount in the specific cycle. Further, in the second embodiment, the ignition timing of the spark plug 30 is retarded until a timing after the second checking injection.

Furthermore, as shown in FIG. 7, in the second embodiment the start timings for the first and second checking injections are set to timings such that the start timings and in-cylinder pressure become equal to those for the sub-injection. Specifically, the start timing of the first checking injection is set to a timing that is equal to the start timing of the sub-injection, and the start timing of the second checking injection is set to a timing at which a piston position becomes equal to a piston position in the first checking injection. By making the injection conditions of the first and second checking injections uniform with the injection conditions of the sub-injection in this way, similar to the above described first embodiment, the checking accuracy with respect to the sub-injection can be raised. Further, by performing the checking injection twice in the specific cycle, it is also possible to further enhance the checking accuracy with respect to the sub-injection in comparison to the above described first embodiment.

Furthermore, similar to the above described first embodiment, the sub-injection check is performed by comparing an actual fuel amount that is calculated using a detection value of the A/F sensor 36 and a detection value of the air flow meter 20 with a theoretical fuel amount. However, in the second embodiment, since fuel injected by the first checking injection is burnt at the same time as fuel injected by the second checking injection, a conversion is performed to calculate a fuel amount for a single checking injection by using the following equation (1) when calculating the actual fuel amount.

$$\text{Actual fuel amount} = \text{exhaust gas air-fuel ratio} \times 2 / \text{in-cylinder air amount} \quad (1)$$

Note that, the exhaust gas air-fuel ratio in equation (1) is calculated based on a detection value of the A/F sensor 36. Further, the in-cylinder air amount is calculated based on a detection value of the air flow meter 20.

Where the result of the comparison between the actual fuel amount and the theoretical fuel amount is that the difference between the actual fuel amount and the theoretical fuel amount is equal to or greater than a threshold value, similar to the above described first embodiment, the fuel amount in the main injection is increased in the cycles after the specific cycle. Hence, similar advantageous effects as in the above described first embodiment can be obtained.
[Specific Processing]

Figure 8:
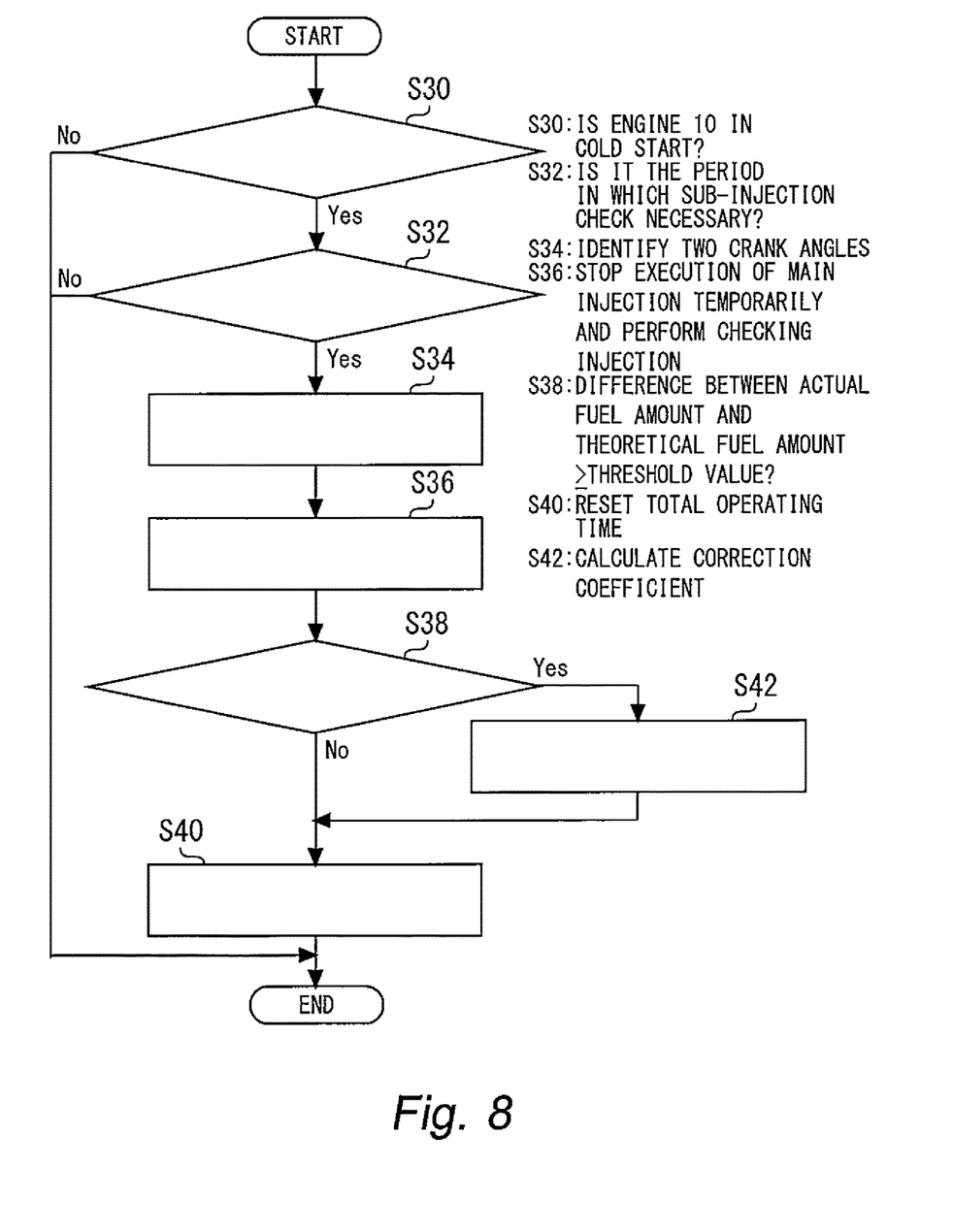
FIG. 8 is a flowchart illustrating a sub-injection check routine that an ECU 40 executes in the second embodiment.

FIG. 8 is a flowchart illustrating a sub-injection check routine that the ECU 40 executes in the second embodiment. Note that, it is assumed that the present routine is repeatedly executed where the driver of the vehicle performs a starting operation.

In the routine illustrated in FIG. 8, first the ECU 40 performs the processing in steps S30 and S32. The processing in steps S30 and S32 is the same as the processing in steps S10 and S12 in FIG. 6.

In step S34, the ECU 40 identifies the crank angle at the start timing of the sub-injection, and a crank angle at which the piston position becomes equal to the piston position at the aforementioned start timing.

Following step S34, the ECU 40 temporarily stops execution of the main injection, and performs a checking injection twice (step S36). In step S36, the ECU 40 controls the port injection valve 26 so as not to execute the main injection. In addition, the ECU 40 controls the in-cylinder injection valve 28 so that checking injections are started at the two crank angles identified in step S34.

Note that the processing in step S36 may be performed once or a plurality of times. That is, when the first checking injection and the second checking injection are taken as a single set, this set may be performed in only one cycle or may be performed in a plurality of cycles. However, with respect to performing the relevant set in a plurality of cycles, although the checking accuracy with respect to the sub-injection can be improved, completion of warming up of the catalyst 34 is delayed compared to with respect to performing both the main injection and the sub-injection. Therefore, it is preferable to perform the relevant set in, for example, three to five cycles, and avoid excessively performing the set of injections.

After step S36, the ECU 40 performs the processing in steps S38, S40 and S42. The processing in steps S38, S40 and S42 is the same as the processing in steps S20, S22 and S24 in FIG. 6.

Thus, according to the routine illustrated in FIG. 8, the same advantageous effects as in the above described first embodiment can be obtained. Further, by performing a checking injection twice in a single cycle, it is possible to further enhance the checking accuracy with respect to the sub-injection in comparison to the above described first embodiment.

The invention claimed is:

1. A control device for an internal combustion engine that is applied to an internal combustion engine comprising an in-cylinder injection valve that is controlled so as to inject a minute amount of fuel in a compression stroke as a sub-injection performed after a main injection in a same cycle, and a spark plug that is controlled so as to perform ignition after the sub-injection, wherein the control device is configured to:
control the in-cylinder injection valve, in a cycle in which the main injection is not executed, so as to perform a checking injection that injects a minute amount of fuel corresponding to the sub-injection; and
calculate an actual fuel amount that is actually injected in the checking injection based on an in-cylinder air amount with respect to performing the checking injection and an air-fuel ratio of exhaust gas of the internal combustion engine, and also check a fuel amount that is injected from the in-cylinder injection valve in the sub-injection based on the calculated actual fuel amount;
wherein the control device is also configured to:
set a valve opening time period of the in-cylinder injection valve in the checking injection so as to become equal to a valve opening time period of the in-cylinder injection valve in the sub-injection; and
control a valve opening start timing in the checking injection so that an in-cylinder pressure becomes equal to an in-cylinder pressure at a valve opening start timing of the in-cylinder injection valve in the sub-injection.

2. The control device for an internal combustion engine according to claim 1, wherein the control device is also configured to:
control the in-cylinder injection valve so as to perform, as the checking injection, a first checking injection that is before compression top dead center, and a second checking injection that is in a same cycle as the first checking injection and is after compression top dead center;
retard an ignition timing of the spark plug with respect to performing the checking injection until a timing that is after the second checking injection;
set a valve opening time period of the in-cylinder injection valve in the first checking injection so as to become equal to a valve opening time period of the in-cylinder injection valve in the sub-injection, and set a valve opening time period of the in-cylinder injection valve in the second checking injection so as to become equal to a valve opening time period of the in-cylinder injection valve in the sub-injection; and
control a valve opening start timing of the in-cylinder injection valve in the first checking injection so as to become equal to a valve opening start timing of the in-cylinder injection valve in the sub-injection, and control a valve opening start timing of the in-cylinder injection valve in the second checking injection so as to be at a position that is equal to a piston position at a valve opening start timing in the first checking injection.

3. The control device for an internal combustion engine according to claim 1, wherein the sub-injection is performed for a purpose of increasing a degree of stratification of an air-fuel mixture at a periphery of the spark plug when the internal combustion engine is cold,
wherein the control device is also configured to control the in-cylinder injection valve so as to perform the checking injection when the internal combustion engine is cold.

4. The control device for an internal combustion engine according to claim 1, wherein the internal combustion engine further comprises adjustment means that adjusts an in-cylinder air amount,
wherein the control device is also configured to control the adjustment means so as to reduce an in-cylinder air amount with respect to performing the checking injection more than an in-cylinder air amount with respect to performing the main injection and the sub-injection.

5. The control device for an internal combustion engine according to claim 1, wherein the main injection and the sub-injection are performed as a part of catalyst warm-up control that increases a degree of stratification of an air-fuel mixture at a periphery of the spark plug when the internal combustion engine is cold to warm up a catalyst that purifies exhaust gas of the internal combustion engine,
wherein the control device is also configured to:
calculate a difference between a fuel amount that theoretically should be injected from the in-cylinder injection valve in the checking injection and the actual fuel amount; and
increase, where the difference is equal to or greater than a threshold value, a fuel amount in the main injection in accordance with the difference from a cycle after a cycle in which the checking injection is performed.

6. The control device for an internal combustion engine according to claim 1, wherein the main injection is performed by the in-cylinder injection valve.

7. The control device for an internal combustion engine according to claim 1, wherein the internal combustion engine further comprises a port injection valve, and the main injection is performed by the port injection valve.

* * * * *